UNITED STATES PATENT OFFICE.

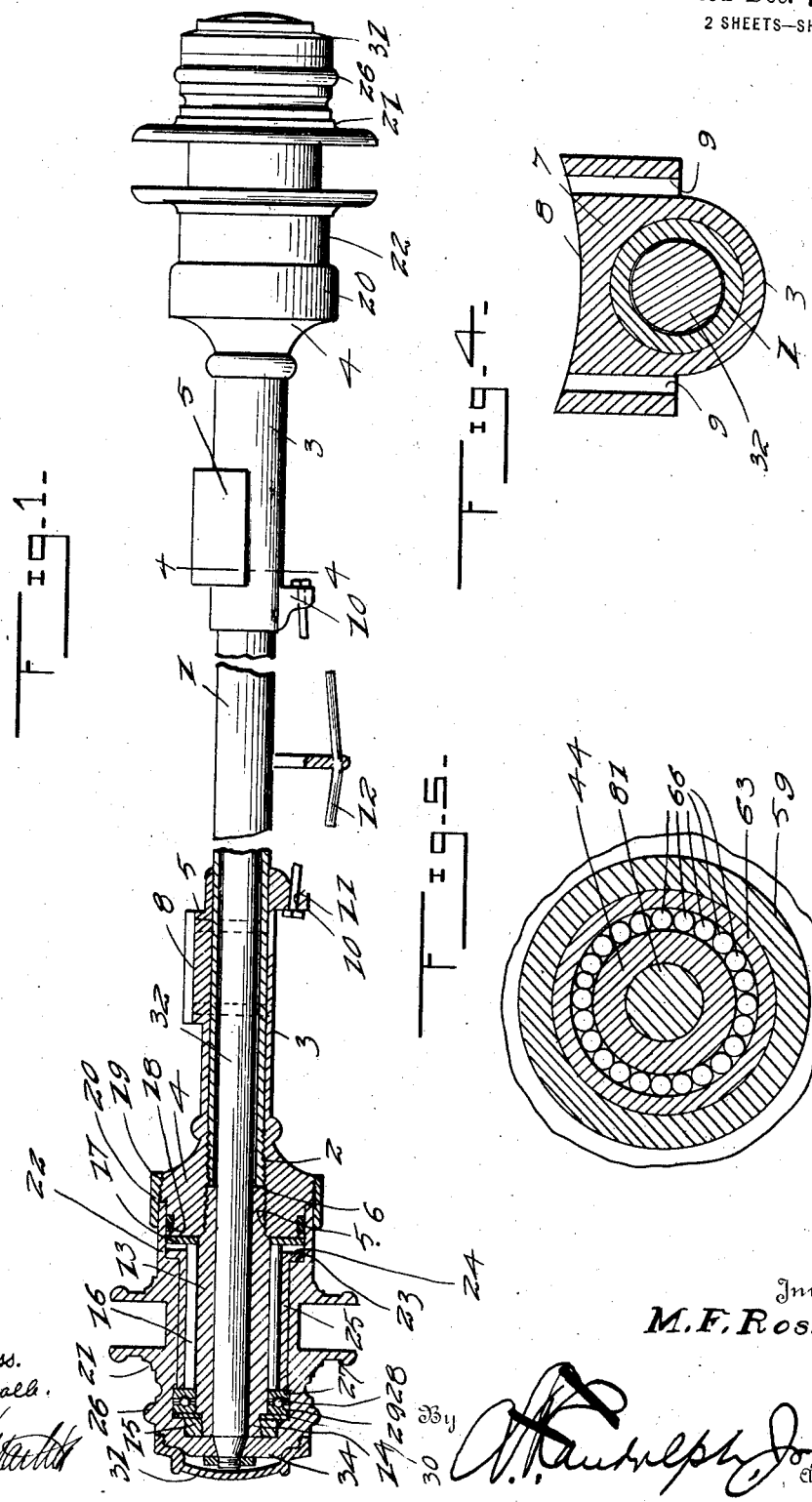

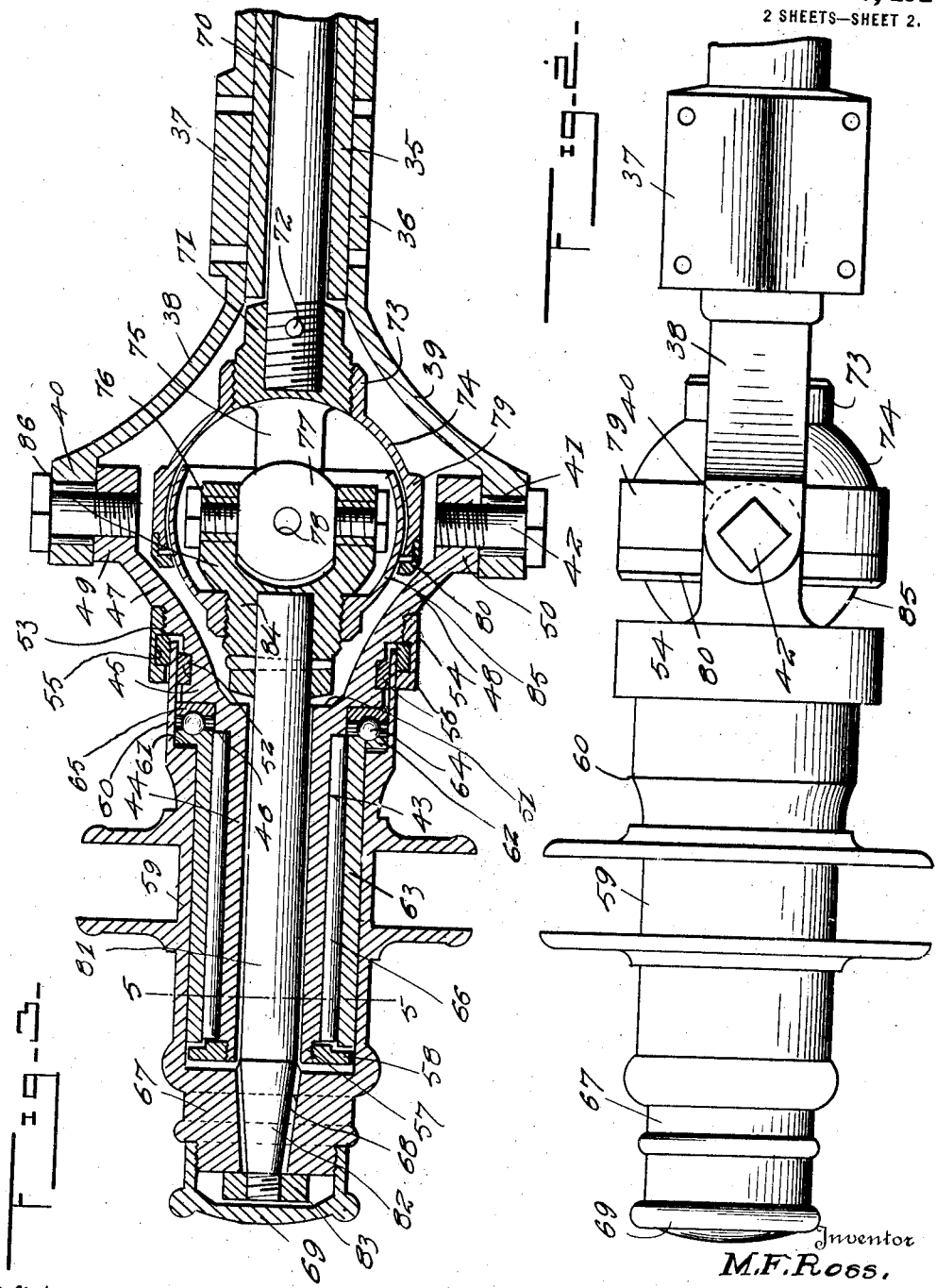
M. F. ROSS.
ROLLER BEARING.
APPLICATION FILED NOV. 17, 1916.
1,361,497.
Patented Dec. 7, 1920.
2 SHEETS—SHEET 2.

MATT F. ROSS, OF WINDFALL, INDIANA.

ROLLER-BEARING.

1,361,497.  Specification of Letters Patent.  Patented Dec. 7, 1920.

Application filed November 17, 1916. Serial No. 131,863.

*To all whom it may concern:*

Be it known that I, MATT F. Ross, a citizen of the United States, residing at Windfall, in the county of Tipton and State of Indiana, have invented certain new and useful Improvements in Roller-Bearings; and I do hereby declare the following to be a full, clear, and exact description of the invention, such as will enable others skilled in the art to which it appertains to make and use the same.

This invention relates to new and useful improvements in roller bearings and the principal object of the invention is to provide a device adapted to be used in connection with drive axles of motor vehicles and the like.

Another object of the invention is to provide a roller bearing adapted to be used in connection with motor vehicles having front wheel drives as well as rear driving wheels.

Still another object of the invention is to provide a novel axle structure which is particularly strong and rigid and capable of withstanding hard usage over rough roads or the like.

Still another object of the invention is to provide a bearing adapted to be used in connection with an axle of the above type which bearing is arranged so as to keep the wheel at all times in proper alinement.

A further object of the invention is to provide a roller bearing and drive axle which axle is of the full floating type and which is so arranged that all weight carrying strain is relieved from the drive axle and carried directly on a wheel spindle thus avoiding the use of roller bearings on the drive axle.

With these and other objects in view the invention consists in the novel combination and arrangement of parts which will be fully set forth in the following specification and accompanying drawings, in which:—

Figure 1 is a view partly in section of a rear drive axle showing the same equipped with roller bearings constructed in accordance with this invention.

Fig. 2 is a fragmentary top plan view of a front drive axle constructed in accordance with this invention.

Fig. 3 is a vertical sectional view through Fig. 2.

Fig. 4 is a vertical sectional view on line 4—4 of Fig. 1 made on an enlarged scale to more clearly illustrate the details of construction, and Fig. 5 is a fragmentary sectional view taken on line 5—5 of Fig. 3 clearly illustrating the annular races for the reception of the rollers.

Referring to the drawings by characters of reference 1 designates the axle casing of the rear axle which is provided at opposite ends with external screw threads 2. Suitable sleeves 3 are fitted over the ends of the axle and are provided with heads 4 portions of which are internally threaded to provide connecting means for coöperation with the threads 2 by which the sleeves are rigidly held in place. These heads 4 are provided with enlarged axial bores which are internally screw threaded as at 5 and the inner ends of the enlarged bores form shoulders 6 at the point where they communicate with the opening extending through the sleeves 3 and axle casing 1. Each of the sleeves 3 is formed near its inner end with a block or enlargement 7, the upper face of which is concaved to provide a spring seat 8. This block 7 projects beyond the outer side faces of the sleeves 13 and is provided with openings 9 for the reception of the arms of the U-bolts by means of which the springs are held in proper position on the axle. Formed at the extreme inner ends of the sleeves 3 are depending ears 10 having apertures 11 formed therein for the reception of the threaded ends of the truss rod 12 which is supported centrally on the axle as shown in Fig. 1.

Threaded into the internally threaded bore 5 of each head 4 is a spindle 13 having its outer end reduced and provided with threads as at 14 on which the wheel retaining nut 15 is threaded. The spindle 3 forms a circular bearing surface against which the cylinders or rollers 16 run and the inner terminals of said cylinders bear against a suitable bearing or thrust ring 17 which engages the outer face of its respective head.

Formed in each head 4 near its outer end is an annular groove 18 and at the inner end of each head is an annular enlarged threaded portion 19 upon which a suitable dust excluding ring 20 is threaded. Each ring 20 extends toward the outer end of each head to a point substantially in alinement with the outer wall of each groove 18 and it will thus be seen that a passage is formed for the reception of the flange on the hub which will be more fully hereinafter described.

The hub previously referred to is designated by the numeral 21 and one end thereof has extending therefrom the flange 22 which extends into the annular passage hereinbefore referred to so that at the point where the flange joins the hub is formed a shoulder 23 against which the flange 24 formed at the inner end of the bearing bushing 25 engages. This bushing is equal in length to substantially the entire length of the hub and thus forms a bearing against which the bearing rollers or cylinders 16 run. The opposite end of the hub is provided with an outwardly extending flange 26 which forms a shoulder at the point where it joins the hub and bearing against said shoulder is a thrust ring 27 provided with an annular ball race in which the bearing balls 28 are seated. A similar annular thrust ring 29 is provided with an annular ball race and bears against the bearing balls opposite the ring 27 and the last named ring is held in place by a suitable washer 30 against which the retaining nut 15 engages. A suitable hub cap 31 is threaded on the outer end of the flange 26 as will be clearly seen upon reference to the drawings.

The main axle extends through the axle casing 1 and is designated by the numeral 32 and the opposite ends of said axle are provided with threaded extensions 33 for the reception of suitable lock nuts 34 for engaging the hub 21 to hold the same against accidental displacement.

In the structure shown in Fig. 3 the vehicle axle is designated by the numeral 35 and is provided at opposite ends with suitable sleeves 36 which like the sleeves 3 are provided with the enlargement 37 to which the springs of the vehicle are connected. Extending forwardly and upwardly from the upper side of each sleeve 36 is an arm 38 formed at its upper end with an apertured ear 40 while a similar arm 39 extends outwardly and downwardly from the under side of the sleeve 36 and is provided at its lower end with an apertured ear 41. The openings in the ears 40 and 41 are arranged in alinement and are adapted to receive the pivot bolts 42 as clearly shown in Fig. 3.

The wheel spindle is designated generally by the numeral 43 and comprises a tubular spindle 44 formed at its inner end with a head 45 which forms a shoulder 46 at the point where it joins the spindle and this head 45 is provided with the inwardly and upwardly extending arm 47 and a downwardly and inwardly extending arm 48 which arms are respectively provided with apertured ears 49 and 50 through which the pivot bolts 42 extend and thus pivotally connect the spindle to the axle. The head is formed with an enlarged bore 51 and is provided at the point where the arms join the same with an annular groove 52. A suitable threaded cylindrical portion 53 is formed on the head between the point where the groove 52 is formed and the inner ends of the arms and this threaded portion has threaded thereon a suitable ring 54 formed with an internal annular groove 55 and this ring extends outwardly toward the outer end of the spindle to a point substantially in alinement with the outer wall of the groove 52. Suitable felt rings 56 are positioned in the grooves 52 and 55 to provide a packing and prevent dust from entering the bearings. The end of the spindle opposite that provided with the head is provided with a reduced threaded portion 57 on which the retaining ring 58 is threaded.

The hub is designated by the numeral 59 and provided at one end with a flange 60 which extends between the packing rings 56 and at the point where the flange 60 joins the hub is formed a suitable shoulder 61 against which the head 62 of the bearing bushing 63 engages. This head is provided with an annular groove forming a ball race in which the bearing balls 64 run and a washer 65 is seated against the shoulder formed between the spindle 44 and head 45 which washer is provided with an annular groove to provide a ball race. It will thus be seen that a thrust bearing is provided for the inner end of the hub thus taking up any wear and providing an easy running structure. Interposed between the spindle 44 and the bearing bushing 63 are suitable cylinders 66 forming the bearings on which the wheel revolves. The hub 59 is provided at the end opposite that having the flange 60 with a suitable head 67 having a tapered bore extending therethrough which is designated by the numeral 68 and tapers toward its outer end. A suitable hub cap 69 is threaded on the outer end of the head 67 and completely incloses the hub retaining nut by means of which the same is rigidly connected to the stub shaft. Rotatably mounted within the axle housing 35 is the main drive axle designated by the numeral 70 having threaded on its outer end a suitable head 71. A pin 72 extends through the head and axle in order to lock the same securely in place and this head is provided with external screw threads on which the nut 73 of the universal housing 74 is threaded. Extending outwardly from the head at diametrically opposite points are a pair of arms 75 which are positioned within the housing and these arms are provided at their outer ends with apertures for the reception of the pivot bolts 76 by means of which they are connected to the ball 77 of the universal joint. This ball 77 is provided with internally threaded bores 78 for the reception of the inner ends of the pins or bolts 76 as clearly shown in Fig. 3. The housing section 74 is provided near its outer end with an enlarged head 79 which is externally screw threaded to receive the retaining ring 80 by means of which the housing sections are held in assembled positions.

Rotatably mounted within the spindle 44 is the stub shaft 81 the outer end of which is provided with the frusto-conical portion 82 which projects into the tapered opening 68 and a nut 83 is threaded on the extreme outer end of the frusto-conical portion 82 and is adapted to engage the outer end of the head 67 of the hub in order to cause the face of the bore 68 to frictionally contact with the frusto-conical portion of the stub shaft. The opposite end of the stub shaft has a head 84 keyed thereto which is provided with external threads on which the universal housing section 85 is threaded and this universal joint housing section is adapted to fit within the housing section 74 and be held in place by means of the ring 80 previously described. Extending outwardly in parallel relation from the end of the head 81 is a pair of parallel arms 86 which are apertured like the arms 75 to receive the pivot pins or bolts 76 by means of which the same are pivotally attached to the ball 77 of the universal joint.

It will be apparent that in the structure used in Fig. 3 the shaft 70 will turn the universal joint thereby causing the stub shaft 81 to rotate and thus rotate the hub 59. When the vehicle turns it will be evident that the stub shaft and spindle will be moved with the spindle swinging on the pivot bolts 42 and the stub shaft swinging on the pivot bolt 76 of the universal joint thus transmitting power to the wheels regardless of their positions.

While in the foregoing there has been shown and described the preferred embodiment of this invention, it is to be understood that such changes may be made in the combination and arrangement of parts as will fall within the spirit and scope of the invention as claimed.

What is claimed is:—

A wheel bearing comprising a hollow spindle provided at its inner end with an annular shoulder, rollers bearing against the exterior surface of the spindle and bearing at their inner ends against said shoulder, a bushing surrounding the rollers, antifriction devices interposed between the inner end of the bushing and the spindle, and a head detachably mounted upon the outer end of the spindle and serving to hold the rollers and the bushing in position thereon.

In testimony whereof I affix my signature in presence of two witnesses.

MATT F. ROSS.

Witnesses:
WALL CURTIS,
H. C. HASKETT.